G. H. GASTON & P. MEYER.
WASHING AND SCRUBBING MACHINE.
APPLICATION FILED JAN. 23, 1913.

1,197,733.

Patented Sept. 12, 1916.
2 SHEETS—SHEET 1.

WITNESSES:

INVENTORS:
George H. Gaston
and Peter Meyer,
By Attorneys,

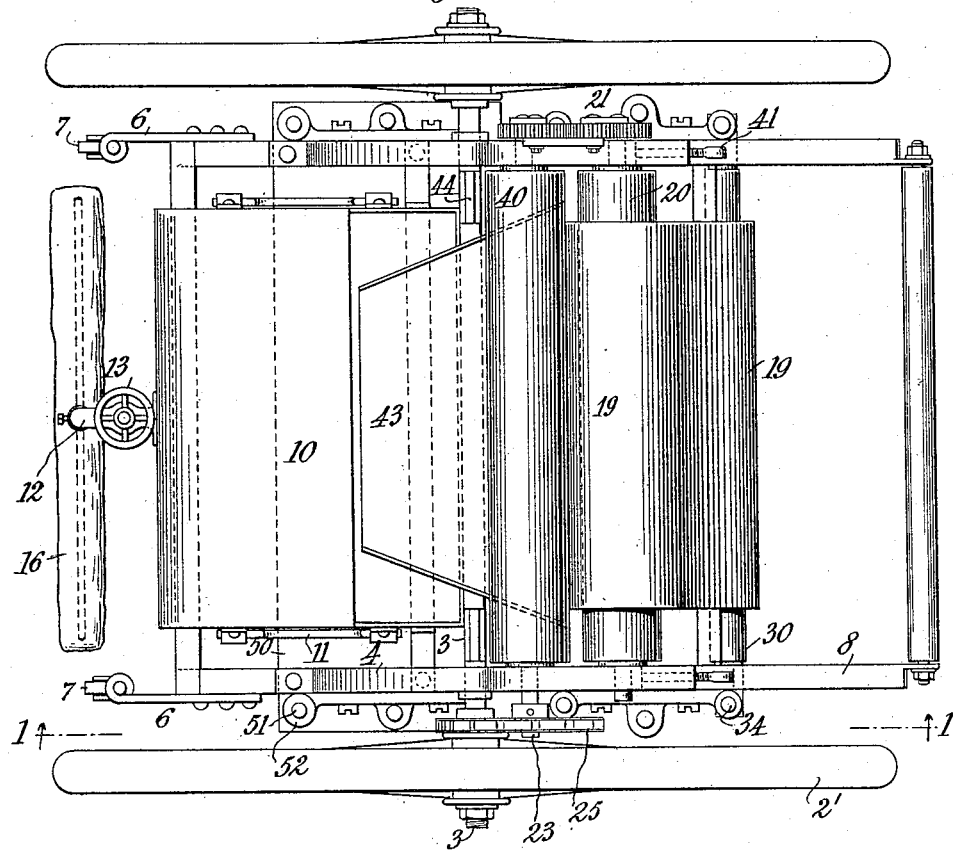

UNITED STATES PATENT OFFICE.

GEORGE H. GASTON, OF NEW YORK, N. Y., AND PETER MEYER, OF NEWARK, NEW JERSEY.

WASHING AND SCRUBBING MACHINE.

1,197,733. Specification of Letters Patent. Patented Sept. 12, 1916.

Application filed January 23, 1913. Serial No. 743,837.

*To all whom it may concern:*

Be it known that we, GEORGE H. GASTON, residing in the borough of Manhattan, city, county, and State of New York, and PETER MEYER, residing in Newark, in the county of Essex and State of New Jersey, both citizens of the United States, have jointly invented certain new and useful Improvements in Washing and Scrubbing Machines, of which the following is a specification.

This invention relates to washing and scrubbing machines for floors or the like, and aims to provide certain improvements therein.

The present invention provides a simple and reliable device whereby the flushing, scrubbing and drying of floors, or the like, or any one or more of these operations, may be efficiently carried out by mechanical means.

Other advantages and points of improvement will hereinafter appear and be pointed out in the following description.

An embodiment of the invention is illustrated in the accompanying drawings, wherein—

Figure 1:
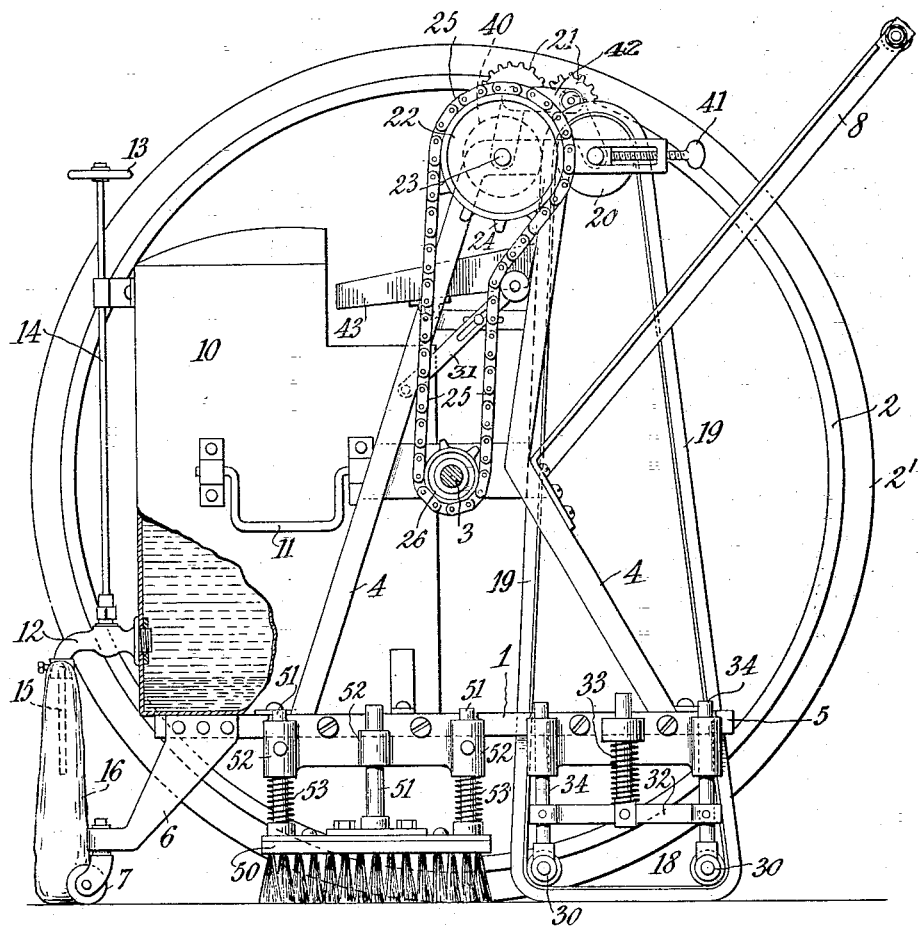
Figure 3:
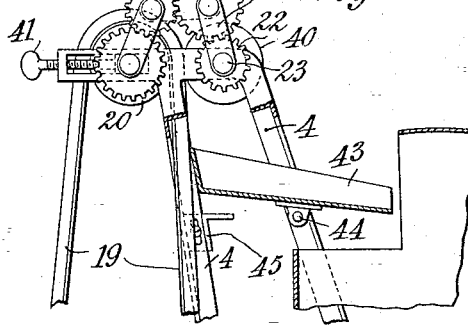

Figure 1 shows the device in side elevation, with the wheel on the near side removed. Fig. 2 shows a top plan of the device. Fig. 3 illustrates in detail the wringing or squeezing means.

In said drawings, the numeral 1 designates a suitable carriage or transporting device, by means of which the device may be moved from place to place over the floor surface to be cleaned. The carriage is preferably in the form of a wheeled cart having wheels 2, preferably provided with resilient or pneumatic tires 2', mounted upon an axle 3, supported in upright frames 4, 4, extending upwardly from a platform 5. At the front end of the platform are preferably two legs 6 for supporting the front end of the platform, and these legs may be provided with rollers or casters 7, 7 which are preferably so mounted as to swivel. Attached to the uprights 4, 4, is preferably a handle-bar or handle 8, by which the device may be taken hold of and propelled and directed.

Upon the platform 5, and preferably at its front end, there is mounted a liquid-reservoir or tank 10. The tank is preferably removably mounted upon the platform, so that it may be removed therefrom and its contents decanted, and for this purpose it may be provided with handles 11. Near the lower end of the tank, and preferably at a slight distance above its bottom (for a purpose to be hereinafter explained) is a valve-controlled outlet 12, the valve of which may be conveniently manipulated by a hand wheel 13 on a shaft 14 extending above the top of the tank. Liquid is adapted to be discharged from this outlet for the purpose of flushing the floor. This outlet is moreover preferably provided with a sprinkling or disseminating nozzle 15, which nozzle preferably has a width corresponding to the width of the machine. Surrounding the nozzle is preferably a mop or the like 16 adapted to be saturated by liquid which issues from the nozzle. The mop extends into contact with the floor, or other surface to be cleaned and flushes and rubs the same as the device is moved along, thus dissolving, taking-up, or loosening the dirt, etc., in the manner in which this is done in the ordinary washing of floors by means of a wash-rag or mop.

For the purpose of taking up the flushing liquid, with the dirt, etc., suspended or dissolved therein, and "drying" the floor or other surface, suitable means 18 for the purpose is provided. This means preferably comprises an absorption-device, preferably arranged in the rear of the flushing device, and preferably in the form of an endless belt or band 19 of absorbent-material, such as felt, with an impervious backing adapted to bear in part upon the floor or other surface. This band 19 of absorption-material is furthermore adapted to be given movement in such manner that fresh portions thereof are brought into contact with the surface of the floor as the device is moved over the floor, and to this end it may be mounted upon a series of rollers and be driven from the shaft 3. As shown, the band 19 passes over a roller 20 mounted in the upper parts of the upright frames 4, 4, and over rollers 30, 30 at a lower part of the apparatus. The roller 20 is driven through a train of gears 21, driven from a gear 22 on a shaft 23, which shaft is in turn driven by a sprocket-wheel 24 connected by means of a sprocket-chain 25 with a sprocket-wheel 26 fixed to the shaft 3 of the apparatus. Rotation of the wheels 2 of the device (as when the device is propelled) therefore causes a rotation of the roller 20, which roller imparts movement to the band 19 of absorbent-material. A device 31 may be provided for taking up the slack in chain 25. The band 19 of absorbent-material is also preferably adapted to be resiliently pressed into contact with the floor or other surface, in order to follow any unevenness or irregularities therein, and for this purpose, the lower rollers 30, 30 may be mounted on a cross-piece 32, the weight of which bears upon the band 19 of absorbent-material and presses it into contact with the floor. The weight of the cross-bar 32 is preferably augmented by the force of a spring 33 and the cross-bar is preferably guided by means of guides 34, working in socket-pieces 35, on the carriage 1. Suitable means are also preferably provided for expelling or "wringing" the water from or out of the band 19, so that the band may be in condition to absorb further quantities of wash-water from the floor. This may be accomplished by providing a wringing roller 40 opposite the roller 20 over which the band 19 passes, and mounting the two rollers in such manner that they may be pressed against the band 19. This may be done by mounting the roller 20 in movable bearings and providing suitable means, such as a feed-screw 41, for pressing the roller 20 toward the roller 40. The roller 40 is mounted on the shaft 23 having the sprocket-wheel 24 fixed thereon. Roller 40 therefore rotates when the wheels 2 move, and the gearing between the shaft 23 on which the roller 40 is mounted and the shaft on which the roller 20 is mounted is preferably such that the rollers have the same peripheral speed of rotation. The band 19 interposed between the rollers 20 and 40 will thus be drawn between the rollers 20 and 40 as they rotate, and as it passes between the rollers, it will be squeezed and the water absorbed thereby will be squeezed or expelled therefrom. Beneath the rollers there is preferably arranged a pan or shelf 43 adapted to bear against and to receive the drippings from the band 19 squeezed out by the rollers 20 and 40, and this pan is preferably arranged to empty into the tank or receptacle 10 so that the water may be used over again in the washing process. The pan 43 may be mounted on pivots 44 and with its greatest weight at its inner end, and is adapted to bear against the absorbent belt and scrape off or receive the surplus water which is squeezed out by the wringing rollers. Furthermore, by being thus mounted, the pan may adjust itself to any slackness in the absorbent belt, so that the inner edge of the pan will continue to bear against the belt. A stop 45 may be provided for limiting the extent to which said pan may move around its pivots, either by the pulling action of the belt or by its own movement. This stop may be made adjustable. Much of the dirt and other matter suspended in the water which is returned to the tank will settle to the bottom thereof, and in order that this may not be carried off in the water which passes out of the tank for flushing the floors, the outlet 12 is arranged, as hereinbefore explained, at a distance above the bottom of the tank. The matter which settles will therefore be retained in the bottom of the tank and it may be later removed by decanting the contents of the tank, or means may be provided for the purpose. In order to provide for the movement toward and away from one another of the rollers 20 and 40 without disconnecting the train of gears which connects the gears on the respective rollers, said train of gears is mounted on links 42 which permit of this movement of the rollers.

In order to bring the wash-water into more intimate contact with the flushed surface and in order to loosen up the dirt and other matters to be removed in the cleaning process, suitable scrubbing means are provided. This means is preferably in the form of a brush 50 extending across the machine, arranged between the flushing and "drying" or absorbing means, and also preferably arranged to follow any unevenness or irregularities in the floor or other surface being cleaned. For this purpose it may be provided with guide-rods 51 working in sockets 52 on the body of the machine in such manner that the weight of the brush causes it to press against the floor, and the pressure due to the weight of the brush may be augmented by means of springs 53 which may be in the form of coil springs surrounding the guide-rods 51.

It is obvious that many modifications and changes may be made in the embodiment of the invention which has been illustrated and described without departing from the spirit of the invention.

What is claimed is:—

In a machine for cleaning floors or the like, the combination of a liquid tank, flushing means connected with said tank, means for absorbing liquid applied in flushing, means for expelling liquid from said absorbing means, said means being located above the normal liquid level of said tank, whereby the expelled liquid may flow by gravity back into said tank, said expelling means comprising a pair of squeezing rollers having a driving connection between them, and means for adjusting the proximity of said rollers to one another, comprising a gear wheel on each of the squeezing rollers, and an intermediate gear adapted to adjust itself to movements of said squeezing roller gears toward and away from each other.

In witness whereof, we have hereunto signed our names in the presence of two subscribing witnesses.

GEORGE H. GASTON.
PETER MEYER.

Witnesses as to signature of Geo. H. Gaston:
F. L. WHITE,
C. E. TULLY.

Witnesses as to signature of Peter Meyer:
GUSTAVE R. THOMPSON,
FRED WHITE.

Copies of this patent may be obtained for five cents each, by addressing the "Commissioner of Patents, Washington, D. C."